United States Patent
Taylor et al.

(10) Patent No.: US 7,627,827 B2
(45) Date of Patent: Dec. 1, 2009

(54) PROVIDING SMART USER INTERFACES BASED ON DOCUMENT OPEN AND/OR EDIT CONTEXT

(75) Inventors: Brandon Taylor, Issaquah, WA (US); Hani Saliba, Seattle, WA (US); Rhae-Christie Shaw, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 11/151,832

(22) Filed: Jun. 14, 2005

(65) Prior Publication Data

US 2006/0282784 A1    Dec. 14, 2006

(51) Int. Cl.
G06F 3/00 (2006.01)
G06F 17/00 (2006.01)
G06F 3/048 (2006.01)

(52) U.S. Cl. .................... 715/751; 715/255; 715/764

(58) Field of Classification Search .................. 715/751
See application file for complete search history.

(56) References Cited

U.S. PATENT DOCUMENTS

| 5,220,657 | A * | 6/1993 | Bly et al. ............... 711/152 |
| 5,806,078 | A * | 9/1998 | Hug et al. ............... 715/205 |
| 6,751,617 | B1 * | 6/2004 | Anfindsen ............... 707/8 |
| 7,451,321 | B2 * | 11/2008 | Dryer ............... 713/177 |
| 2002/0035487 | A1 * | 3/2002 | Brummel et al. ............... 705/3 |
| 2004/0230891 | A1 * | 11/2004 | Pravetz et al. ............... 715/511 |
| 2004/0250099 | A1 * | 12/2004 | Pravetz et al. ............... 713/193 |
| 2005/0005248 | A1 * | 1/2005 | Rockey et al. ............... 715/853 |
| 2005/0172239 | A1 * | 8/2005 | Liu et al. ............... 715/763 |

* cited by examiner

Primary Examiner—William L Bashore
Assistant Examiner—Henry Orr
(74) Attorney, Agent, or Firm—Merchant & Gould P.C.

(57) ABSTRACT

Methods, systems, and computer program products provide intelligent user interfaces based on a context or mode of a document. A method involves opening the document in a context that only facilitates reading, disabling editing commands associated with the document and/or disabling typing functionality for editing the document, and displaying a transition button via the intelligent user interface. The transition button is operative, when selected, to initiate transition of the document between the context that only facilitates reading and a context that facilitates editing. The method also involves receiving a selection of the transition button, in response to receiving the selection and transitioning from the context that only facilitates reading to the context that facilitates editing. Transitioning to the editing context includes enabling the editing commands and typing functionality. The method may also involve transitioning from the context that facilitates editing back to the context that only facilitates reading.

14 Claims, 5 Drawing Sheets

PROVIDING SMART USER INTERFACES BASED ON DOCUMENT OPEN AND/OR EDIT CONTEXT

BACKGROUND

Certain document files are not intended for editing or at minimum should not be saved over the original document file. For instance, in previous server based collaboration systems, transitioning between reading and editing modes is error prone and non-intuitive. For instance, when a user selects a file to read and not for editing, an application is launched and the document is placed in a "read-only" state. This process avoids having locks placed on document files that are mostly read and not edited. However, the confusing downside is that the "read-only" state has features that do not exhibit a "read-only" state. The title-bar reads "Read-Only", but the file isn't truly "read-only" in the file system. For instance, typing functionality and the commands are still operative and when "SAVE" is selected or pressed, a lock for the file is retrieved in the form of a "Save As" dialog box. Thus, some features of the "read-only" state give the impression that the document file is being edited, however the document file is not really being edited until "Save" is selected. This functionality confuses users as to the reality of the state in which they are operating. Consequently, some users don't notice the title-bar, edit their long document, and press "Save" to find that another user is editing the document elsewhere.

Other scenarios that do not even involve a server are also impacted. For instance documents that are electronically signed ideally should invalidate the signature when the document is edited. However, in previous systems despite some warning dialogs, signature blocks are broken with relative ease. Another scenario where a read-only" state is not completely apparent involves information rights protected documents that permit authorized users to make changes after authentication. Therefore, an unaddressed need exists in the industry to address the aforementioned deficiencies and inadequacies.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing methods, systems, and computer-readable mediums for providing intelligent user interfaces based on a mode or context of an electronic document. In general, the present invention allows users of electronic documents to distinguish clearly between what is "read-only" context and "editing" context of an electronic document. Embodiments of the present invention also allow the users to easily transition out of a read-only context state and into an editing context state whenever a user desires to transition. The experience is kept clean and light to help users clearly understand that the "read-only" context is a "mode" that is optimized for non-editing. Features of embodiments of the present invention include disabling and hiding most of the commands that would "dirty" a document and blocking a user from typing in order to prevent accidental edits that will not be saved. This feature also encourages users to press a transition button to get out of the "read-only" mode when a user wants to edit.

One embodiment is a method for providing an intelligent user interface based on a context, state, or mode of a document. The method involves opening the document in a context that only facilitates reading, disabling editing commands associated with the document and/or disabling typing functionality for editing the document, and displaying a transition button via the intelligent user interface. The transition button is operative, when selected, to initiate transition of the document between the context that only facilitates reading and a context that facilitates editing. The method also involves receiving a selection of the transition button, in response to receiving the selection and transitioning from the context that only facilitates reading to the context that facilitates editing. Transitioning to the editing context includes enabling the editing commands and typing functionality. The method may also involve transitioning from the context that facilitates editing back to the context that only facilitates reading.

Another embodiment is a computer program product including a computer-readable medium having control logic stored therein for causing a computer to provide an intelligent user interface based on a context of a document. The control logic includes computer-readable program code for causing the computer to open the document in a context that only facilitates reading, disable and hide editing commands associated with the document, disable typing functionality for editing the document, and display a transition button via the intelligent user interface. The transition button is operative when selected to initiate transition of the document between the context that only facilitates reading and a context that facilitates editing.

The computer program product also includes computer-readable program code for causing the computer to receive a selection of the transition button, in response to receiving the selection and transition from the context that only facilitates reading to the context that facilitates editing. Transitioning to the context that facilitates editing includes revealing editing commands and enabling editing commands and typing functionality. The computer program code is also operative to cause the computer to transition from the context that facilitates editing back to the context that only facilitates reading.

Still another embodiment is a system for providing an intelligent user interface based on a mode of a document. The system includes a client computer with a display unit. The client computer is operative to open the document in a mode that only facilitates reading, disable editing commands associated with the document, and disable typing functionality for editing the document. The client computer is also operative to display via the display unit a transition button operative when selected to initiate transition of the document between the context that only facilitates reading and a context that facilitates editing. The system also includes a server computer in communication with the client computer. The server computer is operative to store the document, share the document among multiple users, and issue locks for editing purposes.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods, computer program products, and systems for providing an intelligent user interface based on a context of a document. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
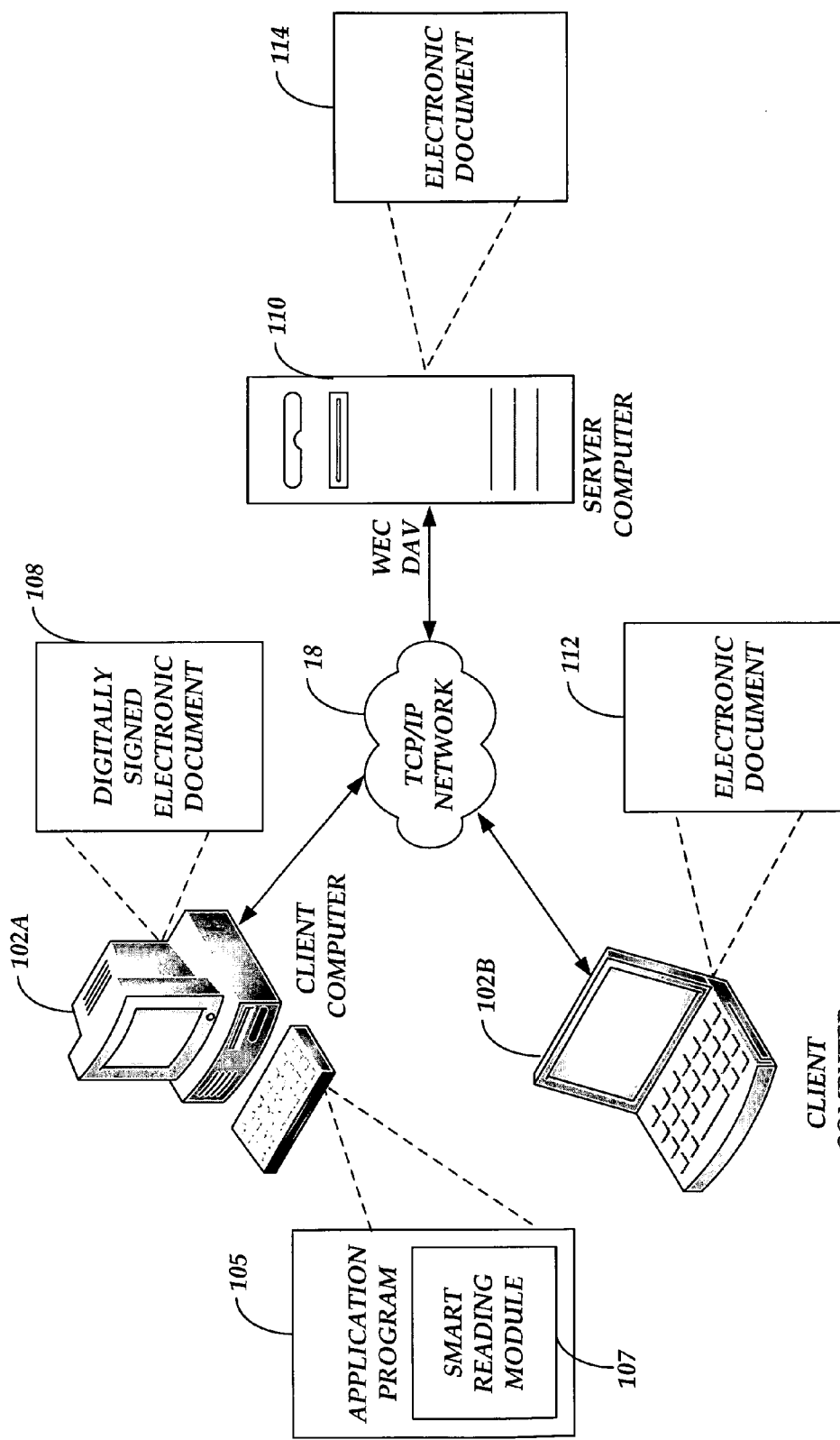
FIG. 1 is a block diagram illustrating client computing apparatuses, a server and a network architecture that provide an illustrative operating environment for illustrative embodiments of the present invention.
Figure 2:
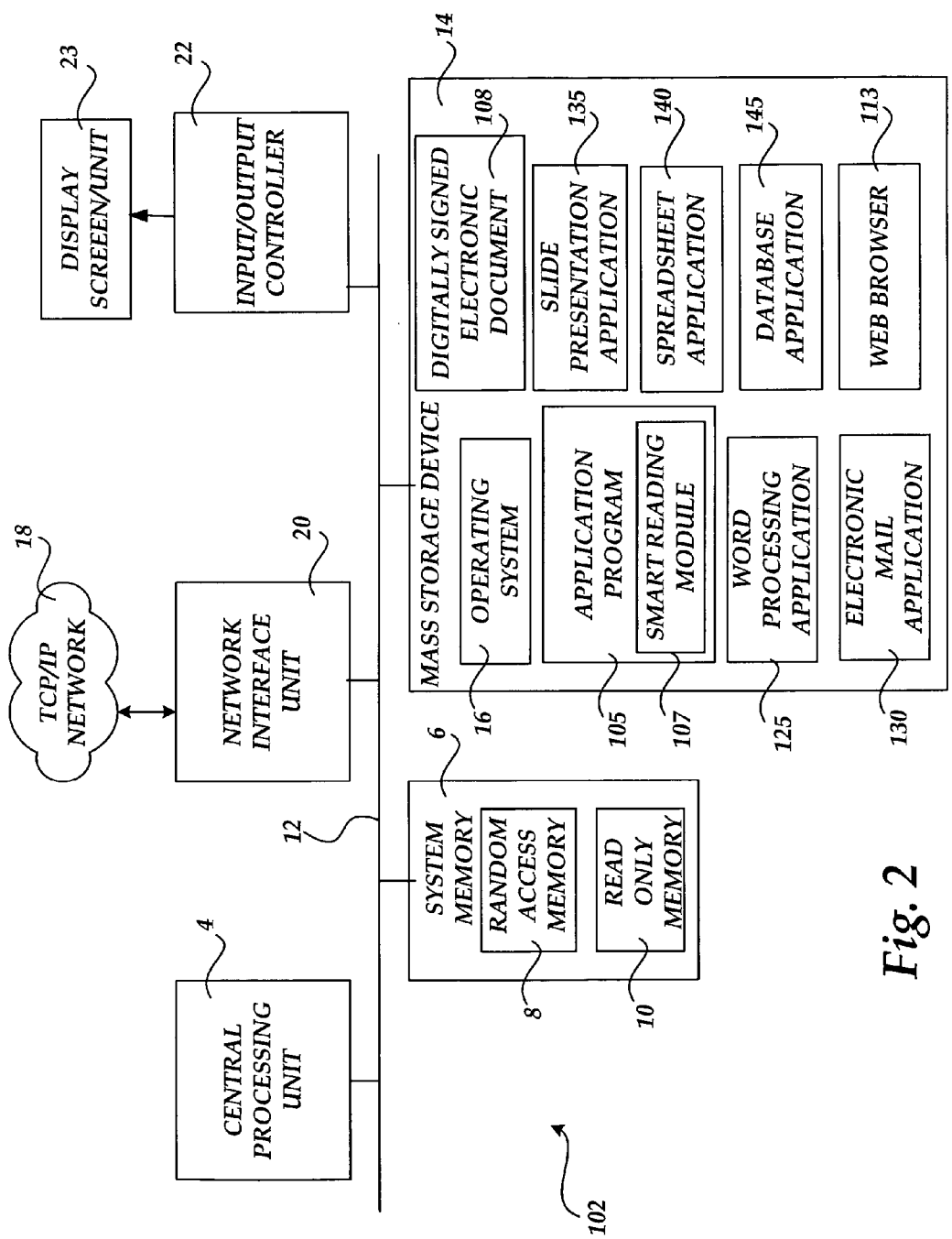
FIG. 2 is a block diagram showing the architecture of a personal or server computer utilized in an illustrative embodiment of the present invention.

Referring now to the drawings, in which like numerals refer to like elements through the several figures, aspects of the present invention and an exemplary operating environment will be described. FIGS. 1-2 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 is a block diagram illustrating client computing apparatuses 102a and 102b, a server 110 and a network architecture that provide an illustrative operating environment 100 for illustrative embodiments of the present invention. An application program 105 resides on the client computing apparatus 102a and includes a smart reading module (SRM) 107. According to an embodiment of the present invention, the application program 105 comprises a multiple functionality software application suite for providing functionality from a number of different software applications. An example of such a multiple functionality application suite 105 is OFFICE manufactured by Microsoft Corporation. The SRM 107 is operative to assist users of an electronic document, such as electronic documents 108, 112, and 114, in reading the electronic document in a "read-only" context. The electronic document 108 is a digitally signed electronic document.

The SRM 107 facilitates the reading of electronic documents whether the document resides on the client computing apparatuses 102a and 102b or on the server computer 110 where the document is accessed via a network 18. The server computer 110 is operative to communicate utilizing FRONTPAGE server extension protocol-remote procedure call (FPSE-RPC) protocol and/or Distributed Authoring and Versioning (DAV) protocol. FPSE-RPC or DAV protocols are utilized to open the document file into locked and unlocked states on the server 110. Web-based DAV is an IETF standard set of platform-independent extensions to HTTP that allows users to collaboratively edit and manage files on remote Web servers. WebDAV features XML properties on metadata, locking, which prevents authors from overwriting each other's changes, namespace manipulation, and remote file management. The electronic document 114 may be a shared document available for collaborative reading and/or editing for multiple users via client computers such as in systems utilizing SHAREPOINT from Microsoft Corporation. Additional details regarding the SRM 107 will be described below with respect to FIGS. 2-5.

Turning now to FIG. 2, an illustrative architecture for a personal or server computer 102 for practicing the various embodiments of the invention will be described. The computer architecture shown in FIG. 2 illustrates a conventional personal or server computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 102 further includes a mass storage device 14 for storing an operating system 16, application programs, such as the application program 105, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 102 may operate in a networked environment using logical connections to remote computers through a TCP/IP network 18, such as the Internet. The personal computer 102 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen or unit 23, a printer, or other type of output device.

As mentioned briefly above, a number of program modules and data files may be stored in the mass storage device 14 and RAM 8 of the personal computer 102, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store the application program 105 for providing a variety of functionalities to a user. For instance, the application program 105 may comprise many types of programs such as a word processing application, a spreadsheet application, a desktop publishing application, and the like. According to an embodiment of the present invention as described above, the application program 105 comprises a multiple functionality software application suite for providing functionality from a number of different software applications.

Some of the individual program modules that may comprise the application suite 105 include a word processing application 125, a slide presentation application 135, a spreadsheet application 140 and a database application 145. An example of such a multiple functionality application suite 105 is OFFICE manufactured by Microsoft Corporation. One or more of the program modules are capable of producing electronic documents such as the electronic documents 108, 112, and 114 (FIG. 1). Other software applications illustrated in FIG. 2 include an electronic mail application 130 and a web browser 113, such as INTERNET EXPLORER from Microsoft Corporation. Additional details regarding providing an intelligent user interface based on a context of a document will be described below with respect to FIGS. 3-5.

Figure 3:
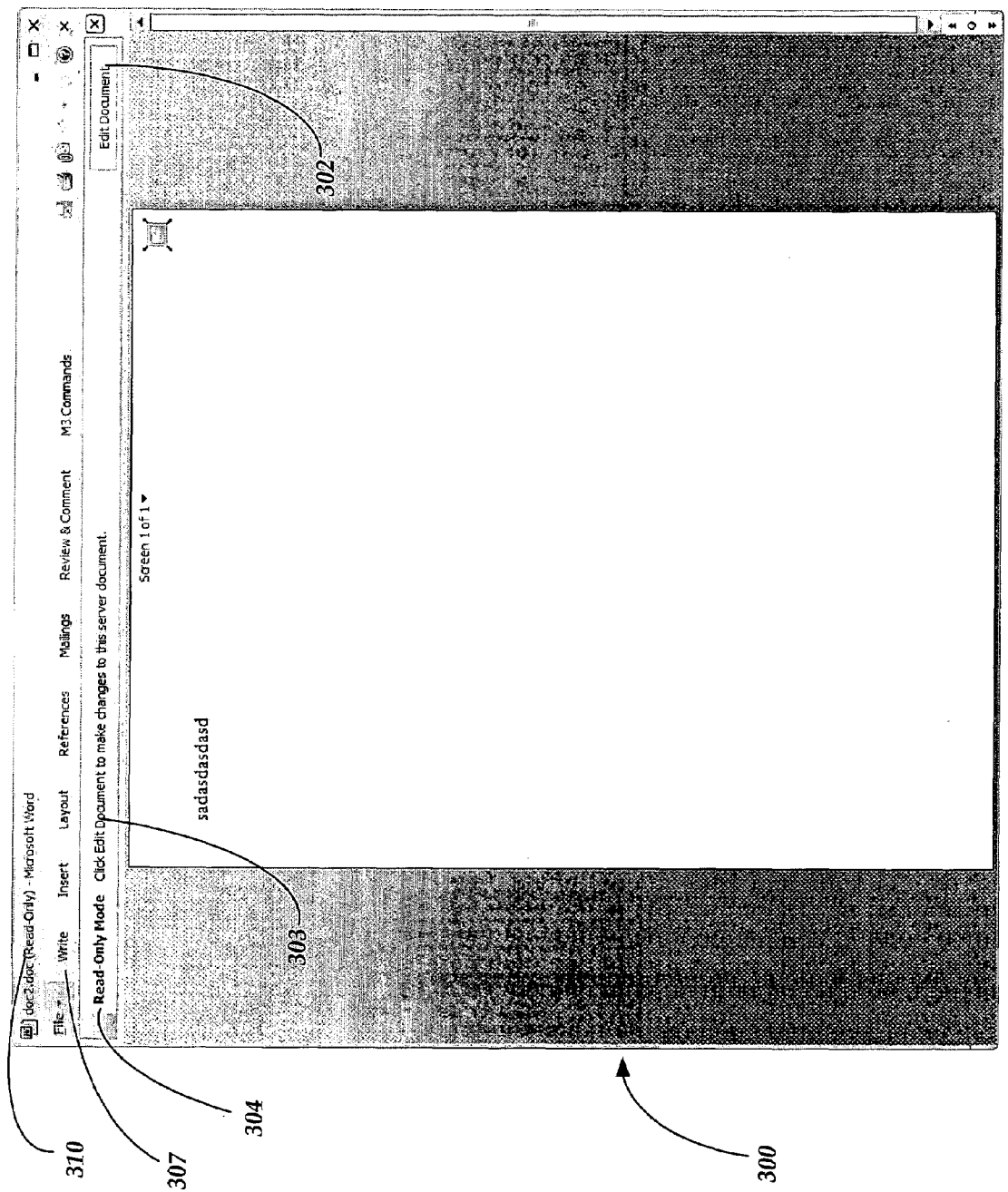
FIG. 3 is a computer screen display illustrating a user interface displaying a "read-only" context of a document according to an illustrative embodiment of the present invention.

FIG. 3 is a computer screen display illustrating a user interface 300 displaying a "read-only" context of a document according to an illustrative embodiment of the present invention. A word processing application such as, the word processing application 125, displays an electronic document while in 'read-only' context. The SRM 107 acknowledges the 'Read-Only' state with an application header 310 and a current state indicator 304. The SRM 107 also provides an edit instruction 303 to direct a user to a transition button 302 to make changes to the electronic document. A 'Write' menu selection 307, as well as other menu selections, is available. However, the SRM 107 disables commands associated with the 'Write' menu selection 307. The SRM 107 also hides or fades some commands and disables typing functionality for the purposes of editing.

Figure 4:
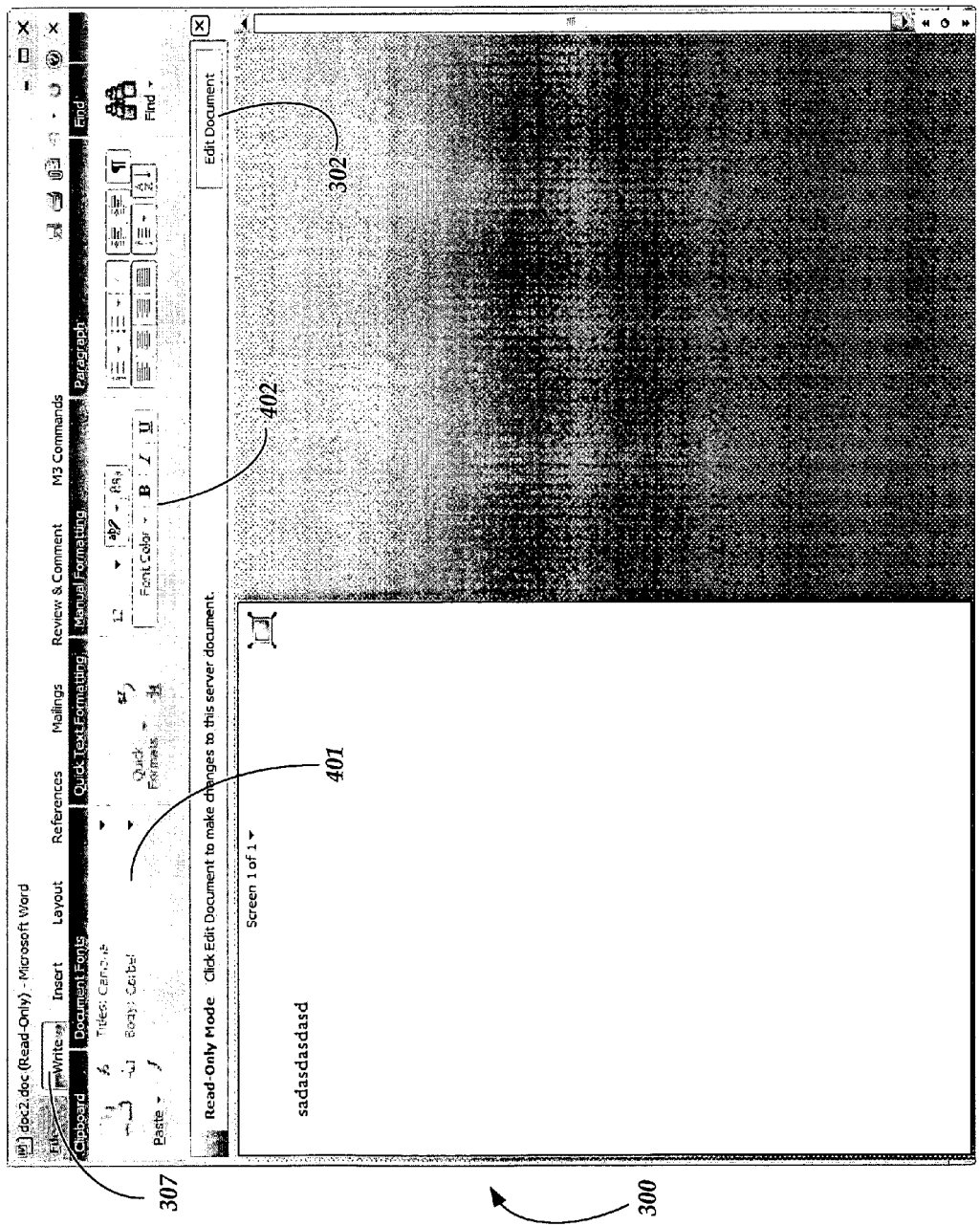
FIG. 4 is a computer screen display illustrating a user interface displaying disabled edit commands according to an illustrative embodiment of the present invention.

FIG. 4 is a computer screen display illustrating the user interface of FIG. 3 displaying disabled edit commands according to an illustrative embodiment of the present invention. As illustrated, some editing commands such as a document font command 401 and formatting selections 402 are faded thereby indicating a 'read-only' context to users. As briefly described above, embodiments of the present invention allow the users to easily perceive and transition out of a 'read-only' context state and into an editing context state whenever a user desires to transition. The experience is kept clean and light to help users clearly understand that the "read-only" context is a "mode" that is optimized for non-editing. Features of embodiments of the present invention include disabling and hiding most of the commands that would "dirty" a document because users should not be editing the document in a 'read-only' state. The features also include blocking a user from typing in order to prevent accidental edits that will not be saved and to prevent an annoying prompt on close asking a user to save. These features also encourage users to press or select the transition button 302 to get out of the "read-only" mode when a user wants to edit.

The transition button 302 is the main way to transition out of the read-only mode. In embodiments involving a collaborative server based system, the transition button 302 when selected serves as a mechanism to retrieve a write-lock on the electronic document file. In embodiment where the document file resides on a client or personal compute and is 'read-only', then the transition button 302 will serve as a mechanism to save a copy of the document elsewhere for editing. Additionally, this 'read-only' state can be leveraged for other cases that are intended to be more "read-only", such as opening a word processor document attachment in email, documents that are digitally signed, documents that are information rights management (IRM) protected for read permissions, documents marked "read-only" in the file system, and password protected documents.

Figure 5:
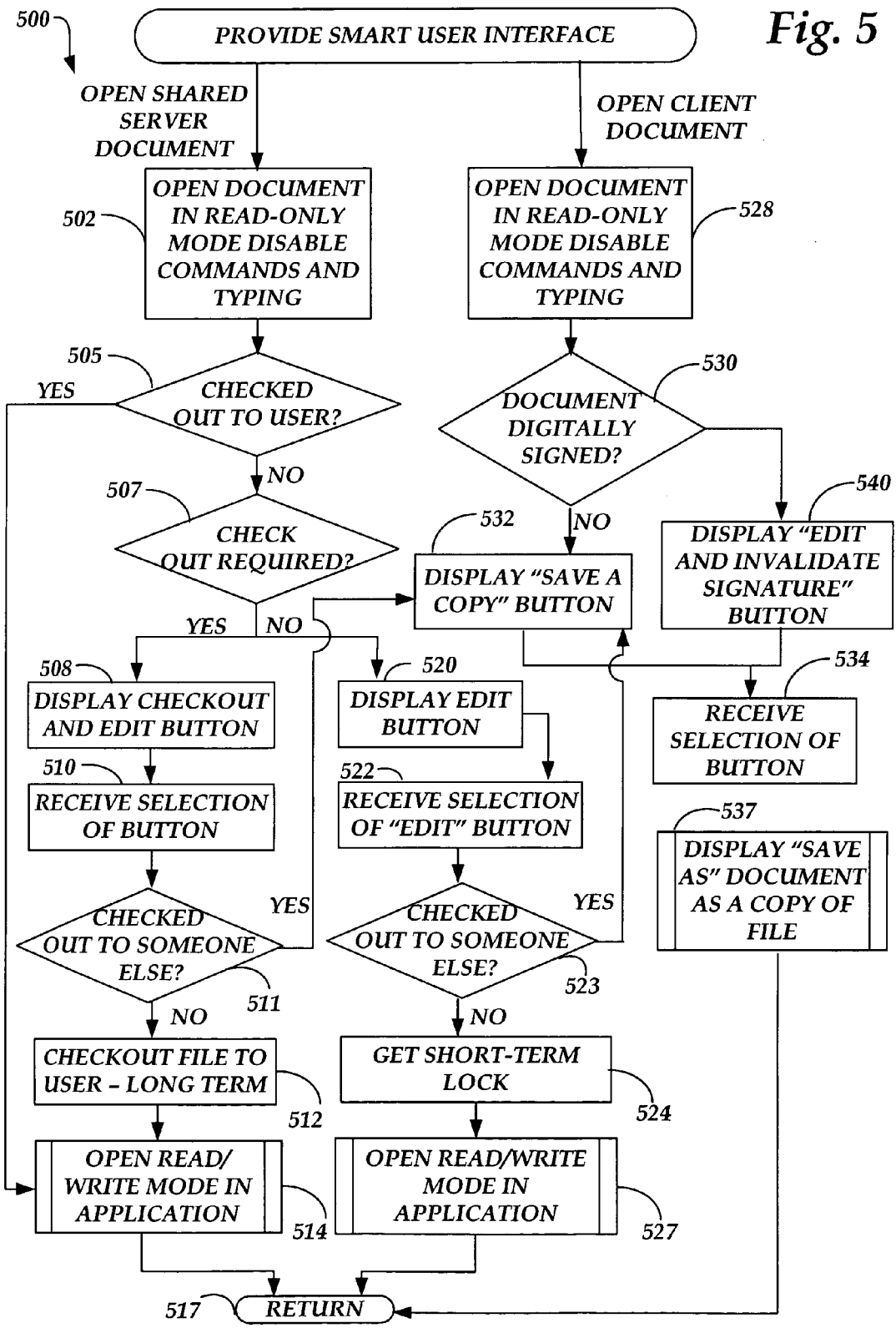
FIG. 5 is an illustrative operational flow performed in providing an intelligent user interface based on a context of a document according to an illustrative embodiment of the present invention.

FIG. 5 is an illustrative routine or operational flow performed in providing an intelligent user interface based on a context of a document according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

FIG. 5 is an illustrative operational flow or routine performed in providing an intelligent user interface based on a context of a document for documents that reside on a server and documents that reside on a client computer according to illustrative embodiments of the present invention. The routine 500 begins at operation 502 for a shared document that resides on a server computer. At operation 502 the SRM 107 opens the document in 'read-only' mode that includes disabling editing commands and typing functionality. This mode only facilitates reading the document. Documents may be opened using a File/Open menu selection or a most recently used (MRU) file selection. Other options include opening the document from network places and opening documents that utilize digital signatures or IRM permissions. The routine 500 then continues to operation 505.

At operation 505, the SRM 107 determines whether the document is checked out to the same present user. When the document is already checked out to the same user, the routine 500 continues from operation 505 to operation 514 described below. When the document is not checked out to the user, the routine 500 continues to operation 507.

At operation 507 a determination is made as to whether checkout of the document is required. When checkout is required, the routine 500 continues from operation 507 to operation 508 where the SRM 107 displays a transition button operative, when selected, to checkout and transition the document to a context that facilitates editing. Determining what transition button to display can be important, because the 'read-only' mode can be a fairly focused and restrictive mode.

Next, at operation 510, the SRM 107 receives a selection or press of the transition button operative, when selected, to checkout and transition the document to a context that facilitates editing. Then at operation 511, the SRM 107 determines whether the document has been checked out to someone other than the present user utilizing a long-term lock whereby the document remains checked out even when the user closes a reading session. When the document is checked out to another user, the routine 500 continues to operation 532 described below. When the document is not checked out to another user, the routine 500 continues from operation 511 to operation 512.

At operation 512, in response to receiving the selection, the SRM 107 checks out the document file to the user utilizing a long-term locking mechanism. The routine 500 then continues to operation 514 where the SRM 107 opens an edit mode or a read/write mode in the application program presenting the document. Transitioning to the context that facilitates editing includes enabling the typing functionality for editing the document and enabling the editing commands. The routine 500 then returns control to other routines at return operation 517. In the alternative, the SRM 107 may transition the document back into 'read-only' mode by either checking in the document file to a server from required or non-required check out, or by signing a document with a digital signature in preparation for others to sign. Thus, the document is transitioned from the context that facilitates editing back to the context that only facilitates reading.

When at operation 507, the SRM 107 determines that checkout is not required, the routine 500 continues from operation 507 to operation 520. At operation 520, the SRM 107 displays a transition button operative, when selected, to transition the document to a context that facilitates editing. Next, at operation 522, the SRM 107 receives a selection or press of the transition button operative, when selected, to transition the document to a context that facilitates editing. Then at operation 523, the SRM 107 determines whether the document has been checked out to someone other than the present user. When the document is checked out to another user, the routine 500 continues to operation 532 described below. When the document is not checked out to another user, the routine 500 continues from operation 523 to operation 524.

At operation 524, in response to receiving the selection, the SRM 107 retrieves a short-term lock that terminates when the read and/or edit session is closed. The routine 500 then continues to operation 527 where the SRM 107 opens an edit mode or a read/write mode in the application program presenting the document. The routine 500 then continues to return operation 517 described above.

In contrast, when the document resides on a client computer, the routine 500 begins at operation 528 where the SRM 107 opens the document in 'read-only' mode that includes disabling editing commands and typing functionality. The routine 500 then continues to operation 530.

At operation 530, the SRM 107 determines whether the document has been digitally signed. When the document is not digitally signed, the routine 500 continues to operation 532 where the SRM displays a transition button operative, when selected, to save a copy of the document and transition the copy to a context that facilitates editing. When the 'Save a Copy' transition button is selected, a copy of the document is saved elsewhere for editing. At operation 530, when the document is digitally signed, the routine 500 continues from operation 530 to operation 540.

At operation 540, the SRM 107 displays a transition button operative, when selected, to invalidate the digital signature and transition the document to a context that facilitates editing. This button explicitly indicates that editing the document will invalidate digital signatures. Next, the routine 500 continues from operation 532 or operation 540 to operation 534.

At operation 534, the SRM 107 receives a selection or press of the 'Edit and Invalidate Signature' button or the 'Save a Copy' button depending on whether the document was digitally signed. Then at operation 537, in response to receiving the selection, the SRM 107 displays a 'Save As' dialog in order to save a copy of the document elsewhere for editing purposes. The routine 500 then returns control to other routines at return operation 517.

Based on the foregoing, it should be appreciated that the various embodiments of the invention include methods, systems, and computer-readable mediums for providing an intelligent user interface based on a context of a document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for providing an intelligent user interface based on a context of a document, the method comprising:

opening the document in a context that only facilitates reading by a user;

disabling editing commands for editing the document and typing functionality, wherein disabling the typing functionality comprises blocking the user from typing to prevent accidental edits that will not be saved in the context that only facilitates reading and to prevent the initiation of a prompt requesting the user of the document to save the document in the context that only facilitates reading;

hiding at least one of the editing commands to indicate the context that only facilitates reading and to prevent the document from being edited in the context that only facilitates reading;

displaying a transition button via the intelligent user interface, the transition button operative when selected to initiate transition of the document between the context that only facilitates reading and a context that facilitates editing;

receiving a selection of the transition button;

in response to receiving the selection, transitioning from the context that only facilitates reading to the context that facilitates editing wherein transitioning to the context that facilitates editing comprises enabling at least one of the typing functionality for editing the document or the editing commands;

transitioning from the context that facilitates editing back to the context that only facilitates reading;

determining whether the document is digitally signed, wherein when the document is digitally signed, displaying the transition button comprises displaying a transition button operative, when selected, to invalidate the digital signature and in response to invalidating the digital signature, automatically complete a transition of the document to the context that facilitates editing; and saving a copy of the document when the document is in the context that facilitates editing in response to receiving the selection thereby displaying a 'Save As' dialog, wherein the document resides on a client computer and the copy of the document is saved on another computer.

2. The method of claim 1, further comprising determining whether the document is checked out to another user wherein when the document is checked out to another user displaying the transition button comprises displaying a transition button operative, when selected, to save a copy of the document and transition the copy to the context that facilitates editing.

3. The method of claim 1, further comprising:
determining whether the document is checked out to a same user of the document; and
upon determining that the document is checked out to the same user, transitioning from the context that only facilitates reading to the context that facilitates editing.

4. The method of claim 1, further comprising:
determining whether checkout of the document is required wherein when the document is not checked out and checkout is required displaying the transition button comprises displaying a transition button operative, when selected, to checkout and transition the document to the context that facilitates editing; and
checking out the document to a same user of the document in response to receiving the selection and checkout being required thereby obtaining a long-term lock, wherein the document remains checked out after a reading session associated with the document is closed.

5. The method of claim 4, further comprising:
determining whether checkout of the document is required wherein when checkout is not required displaying the transition button comprises displaying a transition button operative, when selected, to transition the document to the context that facilitates editing; and
locking the document from edits by other users of the document in response to receiving the selection and checkout not being required thereby obtaining a short-term lock, wherein the short-term lock terminates when at least one of a read and an edit session associated with the document is closed.

6. The method of claim 1, wherein opening the document comprises opening a document stored on a server computer and wherein the document stored on a server computer is capable of being shared among multiple users.

7. The method of claim 1, wherein opening the document comprises one of the following:
opening a document from a file system marked as 'Read-Only';
opening a document recommended by a software application as a read only document;
opening a document via a 'File/Open as Read-Only' menu selection;
opening a document received as an attachment to an email; and
opening a document having information rights management protection.

8. A computer-readable storage medium having computer-executable instructions which, when executed on a computer, will cause the computer to perform a method of providing an intelligent user interface based on a context of a document, the method comprising:
opening the document in a context that only facilitates reading by a user;
disabling editing commands associated with the document;
hiding at least one of the editing commands associated with document to indicate the context that only facilitates reading and to prevent the document from being edited in the context that only facilitates reading, wherein the at least one of the editing commands comprises a document font command;
disabling typing functionality for editing the document, wherein disabling the typing functionality comprises blocking the user from typing to prevent accidental edits that will not be saved in the context that only facilitates reading and to prevent the initiation of a prompt requesting the user of the document to save the document in the context that only facilitates reading;
displaying a transition button via the intelligent user interface, the transition button operative when selected to initiate transition of the document between the context that only facilitates reading and a context that facilitates editing;
receiving a selection of the transition button;
in response to receiving the selection, transitioning from the context that only facilitates reading to the context that facilitates editing wherein transitioning to the context that facilitates editing comprises enabling at least one of the typing functionality for editing the document or the editing commands;
transitioning from the context that facilitates editing back to the context that only facilitates reading;
determining whether the document is digitally signed, wherein when the document is digitally signed, displaying the transition button comprises displaying a transition button operative, when selected, to invalidate the digital signature and in response to invalidating the digital signature, automatically complete a transition of the document to the context that facilitates editing; and
saving a copy of the document when the document is in the context that facilitates editing in response to receiving the selection thereby displaying a 'Save As' dialog, wherein the document resides on a client computer and the copy of the document is saved on another computer.

9. The computer-readable storage medium of claim 8, further comprising:
determining whether the document is checked out to another user wherein when the document is checked out to another user then displaying a transition button operative, when selected, to save a copy of the document and transition the copy to the context that facilitates editing.

10. The computer-readable storage medium of claim 8, further comprising:
determining whether checkout of the document is required wherein when the document is not checked out and checkout is required then displaying a transition button operative, when selected, to checkout and transition the document to the context that facilitates editing; and
checking out the document to a same user of the document in response to receiving the selection and checkout being required.

11. The computer-readable storage medium of claim 8, further comprising:
determining whether checkout of the document is required wherein when checkout is not required, then displaying a transition button operative, when selected, to transition the document to the context that facilitates editing; and locking the document from edits by other users of the document in response to receiving the selection and checkout not being required.

12. The computer-readable storage medium of claim 8, further comprising:

determining whether the document is digitally signed wherein when the document is digitally signed displaying a transition button operative, when selected, to invalidate the digital signature and transition the document to the context that facilitates editing; and invalidating the signature and save a copy of the document in response to receiving the selection.

13. The computer-readable storage medium claim 8, wherein opening the document comprises one of the following:

opening a document from a file system marked as 'Read-Only';

opening a document recommended by a software application as a read only document;

opening a document via a 'File/Open as Read-Only' menu selection;

opening a document received as an attachment to an email; and opening a document having information rights management protection.

14. A system for providing an intelligent user interface based on a mode of a document, the system comprising:

a client computer having a display unit, the client computer operative to:

open the document in a mode that only facilitates reading by a user;

disable editing commands associated with the document;

disable typing functionality for editing the document, wherein disabling the typing functionality comprises blocking the user from typing to prevent accidental edits that will not be saved in the context that only facilitates reading and to prevent the initiation of a prompt requesting the user of the document to save the document in the context that only facilitates reading;

hide at least one of the editing commands associated with the document to indicate the context that only facilitates reading and to prevent the document from being edited in the context that only facilitates reading;

display via the display unit a transition button operative when selected to initiate transition of the document between the context that only facilitates reading and a context that facilitates editing;

receive a selection of the transition button;

in response to receiving the selection, transition from the context that only facilitates reading to the context that facilitates editing, wherein transitioning to the context that facilitates editing comprises enabling at least one of the typing functionality for editing the document or the editing commands;

transition from the context that facilitates editing back to the context that only facilitates reading;

determine whether the document is digitally signed, wherein when the document is digitally signed, displaying the transition button comprises displaying a transition button operative, when selected, to invalidate the digital signature and in response to invalidating the digital signature, automatically complete a transition of the document to the context that facilitates editing; and save a copy of the document when the document is in the context that facilitates editing in response to receiving the selection thereby displaying a 'Save As' dialog, wherein the document resides on a client computer and the copy of the document is saved on a server computer in communication with the client computer, the server computer operative to store the document and share the document among multiple users.

\* \* \* \* \*

UNITED STATES PATENT AND TRADEMARK OFFICE
CERTIFICATE OF CORRECTION

| | | |
|---|---|---|
| PATENT NO. | : 7,627,827 B2 | Page 1 of 1 |
| APPLICATION NO. | : 11/151832 | |
| DATED | : December 1, 2009 | |
| INVENTOR(S) | : Brandon Taylor et al. | |

It is certified that error appears in the above-identified patent and that said Letters Patent is hereby corrected as shown below:

In column 9, line 5, in Claim 1, delete "signature" and insert -- signature, --, therefor.

In column 10, line 39, in Claim 8, delete "signature" and insert -- signature, --, therefor.

In column 12, line 27, in Claim 14, delete "signature" and insert -- signature, --, therefor.

Signed and Sealed this

Seventeenth Day of May, 2011

David J. Kappos
*Director of the United States Patent and Trademark Office*